April 5, 1966  G. E. H. HILDEBRAND  3,244,599
FUEL ELEMENT FOR NUCLEEAR REACTOR
Filed May 28, 1962
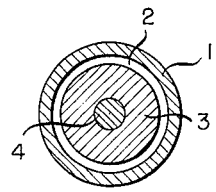
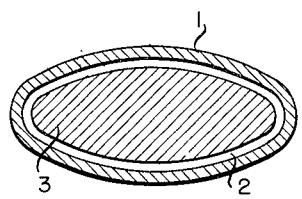
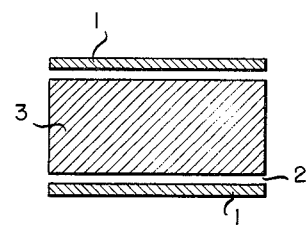
Fig.1  Fig.2  Fig.3
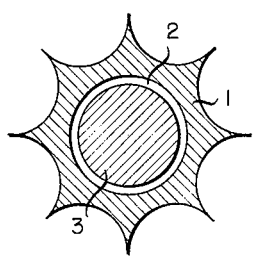
Fig.4
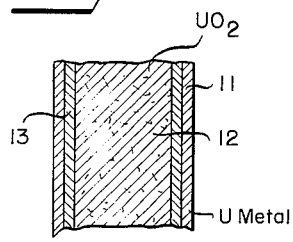
Fig.7
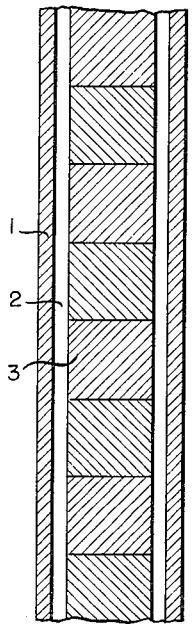
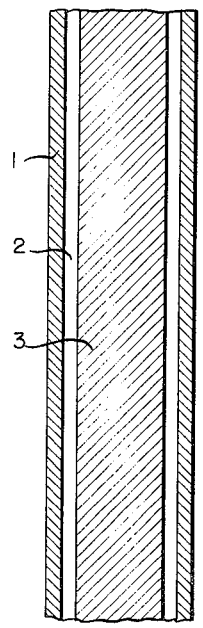
Fig.5  Fig.6
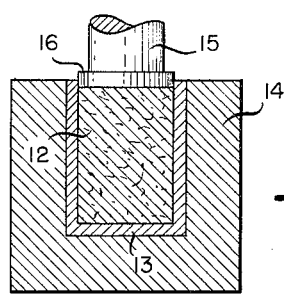
Fig.8
INVENTOR
Gosta Erik Hildebrand Hildebrand
BY  *Strauch, Nolan & Neale*
ATTORNEYS United States Patent Office 3,244,599
Patented Apr. 5, 1966

3,244,599
FUEL ELEMENT FOR NUCLEAR REACTOR
Gosta Erik Hildebrand Hildebrand, Skalby, Sweden, assignor to Fulcrum Aktiebolag, Stockholm, Sweden
Filed May 28, 1962, Ser. No. 197,962
7 Claims. (Cl. 176—72)

This application is a continuation-in-part of my application Serial No. 178,451 filed March 8, 1962, now abandoned.

This invention relates to fuel elements for an apparatus, such as a nuclear reactor which produces heat by the release of nuclear fission energy.

The advantages of using multiregion fuel elements of the general type here disclosed have been discussed in Nuclear Science & Engineering, vol. 12, No. 2, pp. 310, 311 (February 1962), in an article by Fleishman et al. Several problems are presented in the adoption of such a fuel element as the requirements are partly incompatible. Fundamental aspects of the problem may be classified as (1) metallurgical, (2) reactor physics, (3) heat conductivity, and (4) fabrication. For instance, the fuel elements must be able to withstand the temperature gradient which prevails in the elements and in certain cases may amount to considerable values. Further, they must be able to withstand the thermal changes on starting and shutting down the reactor. They must be protected against destruction by annihilation radiation. They must be resistant to corrosion by the coolant chosen for the reactor. They must be able to withstand certain mechanical stresses which may occur as during loading and handling. They must maintain their shape, and the heat generated in the elements has to be conducted out to the exposed surface of the fuel element to be transferred to the coolant used in the reactor. It is obviously not easy to satisfy all of the above-named requirements, and the capability of function and the performance of the reactor are dependent to a high extent on the way in which the above-named problems are solved.

The fuel element consists of some fissile material, such as uranium and/or plutonium, either in the metallic state or in the form of oxides, carbides or the like thereof. The fissile material may be alloyed with suitable metals or it may be secured in one way or the other to a non-fissile material for the purpose of obtaining mechanical stability or the like. Uranium metal has been used as a fissile material, but has an inherent disadvantage resulting from the fact that its volume increases partly as a result of the nuclear fission and partly as a result of phase conversions occurring at certain temperatures, said increase being a maximum at a certain temperature which may be reached during operation of the reactor. As a result, the metal changes its form and the surface of the metal becomes irregular, this in turn has unfavorable consequences as regards the transfer of heat between the fuel element and the coolant. The uranium metal also becomes brittle after a short time of operation and cracks are likely to ensue, especially in case of high mechanical stresses due to great changes in temperature which also results in deformation of the uranium metal body, particularly if there is some sort of texture.

In each part of the fuel element of a reactor there is generated an amount of heat which is proportional to the number of nuclear fissions within the part in consideration. In a homogeneous or fairly homogeneous fuel member, the maximum temperature is obtained in its center of the fuel element wherefrom the temperature decreases more or less rapidly outwardly toward the surface of the member, depending on the thermal conductivity, the geometrical form of the fuel member, the nature of the coolant, etc. The fission process also appears to contribute to the gradual cracking, pulverization or the like of the material. In addition, the fission products formed during the fission process have a destroying action on the material which, for instance, may cause swelling, and there are also changes due to the radiation resulting from the fission process. The rate of destruction is mainly dependent on the composition and physical properties of the material, the manner in which the element is produced, the geometrical form of the element and the temperature level and intensity of radiation in operation of the element. As cracks or deformation occur, the risk of reduced heat transfer between the fuel element and the coolant increases accordingly and this results in a further temperature rise in the interior of the element.

In order to protect the element from attack, if any, by the coolant or moderator or to prevent the fission products from forcing their way out to the coolant or the moderator, the element is usually provided with some sort of cladding, the material of which is chosen with regard to its mechanical and neutron economy properties and its corrosion resistance to the coolant and the moderator. The material of the cladding must be able to withstand the neutron flux and the radioactive radiation. Suitable materials commonly used are metals, such as magnesium, aluminum, zirconium, beryllium and stainless steel.

To overcome the above-named problems it is important to maintain the temperature in the uranium metal as low as possible. The corrosion resistance of the uranium metal to heavy or light water is known to be rather poor. Already at moderately increased temperatures, the chemical reaction becomes so strong as to be likely to put the reactor out of function. Consequently, if uranium metal is used as a fuel material in a reactor with water as a coolant, it is an indispensable requirement to maintain the temperature as low as possible and also to form the element in a manner so as to counteract as far as possible the foregoing unfavorable reaction. For this reason, consideration has been given to making the fuel element from a different material.

Among the conventional uranium compounds with known physical properties, it would seem that uranium dioxide could be a very suitable material for a fuel element in fission reactors. This compound is not a metallic one, but is generally regarded to be a ceramic substance. Important characteristic features of uranium dioxide are its comparatively high corrosion resistance to water, the absence of phase conversions and the possibility if offered of a high operating temperature. Uranium dioxide is a high-temperature material with respect not only to its high fusing point, but also from the point of view of strength and thermal shock. However, its thermal conductivity decreases as temperature increases with the result that an impermissibly high temperature may be obtained in the inner parts of the element at a desired transport of heat from the interior to the surface of the element, if the diameter is too great. This may result in the formation of considerable cracks at the surface and even in pulverization of the material. It is therefore doubtful whether unalloyed or uranium dioxide without enrichment in the fissionable isotope, could be used as a fuel element without special measures being taken to enable the element to operate at a temperature favorable to the physical properties of the material.

In accordance with this invention, it has been found highly desirable to provide a multiregion fuel element so as to adapt the operating temperature to the properties of the fuel element material. This general concept has been discussed and its advantages demonstrated in the article in Nuclear Science & Engineering identified above.

A way of comparing different fuel elements is to compute the maximum obtainable power density in watts per length of fuel rod in centimeters. By way of example, it is assumed that the maximum allowable temperature of the material comprised in the element is in a certain proportion to the fusing point of the material. In applying this practice of calculation which is conventional in the present case and if water is assumed to be used for cooling the element, an element consisting entirely of uranium dioxide will have a power density of about 400 w./cm., and an element consisting entirely of uranium metal will have a power density of about 1200 w./cm.

An object of this invention therefore is to provide a novel fuel element having a higher power density than hitherto conventional fuel elements.

The fuel element type of the present invention comprises substantially two separate parts, namely, an inner part or core and an outer part or mantle, each of which consists substantially of a fissile material, such as uranium, plutonium or the like. The core comprises the fissile material in a form (e.g. uranium oxide) capable of withstanding comparatively high temperatures prevailing in the central part of the fuel element while the mantle comprises the fissile material in a form (e.g. metal) capable of emitting or transferring the amount of heat generated in the core to the reactor coolant. In comparison with the material of the core, the mantle material has superior physical properties at its temperature of operation which is lower than the temperature of the core, and which lower temperature is determined substantially by the thermal stability of the material surrounding the fuel element. Due to this division of the fuel element into separate parts or regions and the use of different materials with different characteristic properties in each part as regards heat resistance, corrosion resistance, high temperature stability, proof against annihilation radiation and resistance to temperature changes, etc., it is possible to better adapt the fuel element to withstand the damaging radiation and temperature conditions occurring in the fuel element of a reactor. The result is a longer mechanical life of the element and a better utilization of the material from the point of fission, such as the burn-up time. It also offers the possibility of adaptation of the fissile material such that the amount of heat which is generated in the various parts of the fuel element and which is substantially proportional to the number of nuclear fissions, will contribute to a longer mechanical life of the fuel element. Further, the generation of heat can be influenced by variation of the density of the various parts of the element, resulting in a variation of the temperature gradient in these parts.

If the maximum obtainable power density in watts per length of rod in centimeters is calculated on the same principles as for an element consisting of a single material, a value of up to about 2300 w. per cm. length of rod may be obtained in an element according to the invention comprising a mantle of uranium metal and a core of uranium dioxide. This extremely favorable technical effect obtained in an element according to the invention can be explained by the fact that the temperature of the core can be considerably higher than the temperature of an element consisting entirely of uranium metal and by the fact that the heat transfer from the center of the rod to the surface thereof is considerably higher than in an element consisting entirely of uranium dioxide.

From the point of view of reactor physics fuel element according to the invention consisting of a core of uranium dioxide and a mantle of uranium metals is superior to the fuel element consisting entirely of uranium dioxide because of the fact that the uranium density is higher and the resonance absorption of the neutrons is lower. With other things unchanged, a reduction in volume of the reactor of up to approximately 30% may be obtainable from the point of view of criticality as well as burn-up, and in spite thereof a higher amount of energy can be released from the reactor provided that the reactor core is constructed so as to render possible utilization of the liberated power per unit of length. For the same reasons, an element according to the invention comprising a core of uranium dioxide and a mantle of uranium metal is less dependent on the uranium density of the uranium dioxide than an element consisting entirely of uranium dioxide, which means that a lower density of the uranium dioxide than hitherto possible can be accepted without substantial decrease of performance from the point of view of reactor physics.

A principal object of the present invention resides in the provision of an intermediate layer between the inner cores and the mantle to facilitate removal and distribution of heat, and to prevent possible chemical reaction between the core material and the mantle material at elevated temperatures. This intermediate layer may be formed of a gaseous substance, a liquid or a solid material. While the different physical states each offer certain comparative advantages and disadvantages, the preferred material is one in a solid state, particularly where it serves also as a container for the core material.

The geometrical shape of an element according to the invention is mainly determined by various constructive and operating conditions. The element may be a rod-like member, cylindrical or elliptical in cross-section, ball-shaped or disc-shaped according to suitability in actual cases.

Another important object of this invention resides in novel methods of forming a solid intermediate layer for multiregion fuel element of the foregoing type that has a round cross-section, e.g. circular, oval or the like. The improved method may involve the steps of forming the intermediate layer in the shape of a hollow cylinder with the outer diameter matched with the inner diameter of the mantle and the inner surface of the hollow cylinder filled with the oxides, carbides or the like powder of uranium. By placing the hollow cylinder in a tool holder and applying pressure to the uranium powder as by a piston, the density of the uranium can be increased to a desired amount and the cylinder then placed in the mantle.

Other objects will become apparent from the claims, and from the following description taken with the accompanying drawings wherein:

FIGURE 1 is a cross-section of a fuel rod element illustrative of the present invention;

FIGURE 2 is a view similar to FIGURE 1 but of a fuel element having an oval shaped cross-section;

FIGURE 3 is a view in section of an embodiment wherein the fuel element has a rectangular cross-section and the mantle consists of parallel plates;

FIGURE 4 is a modification of the embodiment of FIGURE 1 wherein the mantle is shaped to have increased radiation surface;

FIGURE 5 is a longitudinal sectional view of a fuel element whose cross-section may be of any of the types shown in FIGURES 1–4, inclusive, wherein the core element is composed of a plurality of slugs;

FIGURE 6 is a view similar to FIGURE 5, but of an element shaped as a rod;

FIGURE 7 is a view of a further embodiment having a solid intermediate layer; and FIGURE 8 is a diagrammatic showing of a method of making the embodiment as shown in FIGURE 7.

The mantle or jacket which may be a cylindrical tube as shown in FIGURES 1, 2, 4 and 5, consists of or comprises a fissile material, such as metallic uranium, plutonium or the like, and is intended to operate at comparatively low temperatures. The metal may be unalloyed, alloyed with a suitable metal or bonded to a suitable non-fissile material. Each fuel element may be provided with a conventional cladding, not shown, which may have associated cooling fins. Useable alloying elements for the metal are aluminum, silicon, magnesium, titanium, zirconium, vanadium, niobium, tantalum, chromium, molybdenum, and wolfram.

The core 3 comprises or consists of an oxide, carbide, silicide, nitride, boride, sulfide or the like of a suitable fissile metal and may be mixed with a suitable metal in order to increase the heat conductivity and the mechanical stability. Such a material is commonly termed a ceramic substance. The fissile material of the core may also be mixed with substances other than metals. Suitable combinations are, for instance, $C_r=Al_2O_3$, $SiC=Si$, $ZrC=Fe$ and $MgO=Ni$.

The intermediate space containing layer 2 between mantle 1 and core 3 should contain a material preferably chemically inert with respect to the mantle and the core, such as a gas, advantageously hydrogen or helium which has suitable thermal and neutron economy properties, or some liquid material, primarily metals or alloys thereof that are molten at the temperature involved (suitable examples include a lead bismuth or sodium potassium eutectic alloy), or a solid material as will be discussed below.

The thickness of the intermediate layer should be sufficient to prevent any possible chemical reaction between the core and the mantle at the expected temperature range of operation, taking into account the expansions and/or contractions of both the core and the mantle. From the standpoint of reactor physics, it would be desirable to maintain the thickness as small as possible. Also, for a gas layer, the thickness should be as small as practicable and a circulating gas can, of course, be used to remove heat from the interior of the fuel element. With hydrogen as the gas, a larger space can be tolerated than with helium. If the intermediate layer is a liquid metal, the upper limit is determined by the neutron absorption cross section. For a solid layer, the thickness must be sufficient to provide acceptable mechanical properties making it possible to press (not sinter) $UO_2$ powder which serves as the core into a tube as explained below.

From the foregoing it will be apparent that the thickness of layer 2 may be quite small, as for example on the order of 0.05 mm. and where optimum materials can be used, the thickness may be several orders of magnitude larger.

If desired, the core may be mixed with an enriched fissile material, such as $U^{235}$ either unalloyed or alloyed with other substances, or a central rod part 4 of the core may consist of an enriched fissile material.

From the above it will be seen that the core 3 and the mantle 1 consist of different materials, that is to say that the core has a chemical and/or physical composition other than the mantle, thereby to satisfy the above-named requirements, especially as regards a comparatively high temperature of the core and a lower temperature at the surface of the mantle.

In order to provide for a heat transfer between the core and the mantle of a fuel element according to the invention such that the element is able to operate according to the principles mentioned above, the gaseous, liquid or solid intermediate layer 2 referred to above must be properly devised. From the point of view of heat conductivity a liquid metal or a metal compound is preferred, and the fusion temperature of the metal or metal compound should be as low as possible. Further, the intermediate layer 2 must be chemically inert or substantially inert with respect to the material of the core and the mantle. Moreover, the intermediate layer must be consistent with usual reactor physical requirements, primarily as regards the neutron absorption cross-section properties of the intermediate layer.

It is very easy in practice to provide a gaseous intermediate layer, by making core 3 of prepressed or presintered slugs or rods. On the other hand, it is comparatively more difficult to provide an intermediate layer of a solid material that satisfies the thermal requirements, because of the fact that the heat transfer conditions are intimately associated with the degree of contact between the materials, that is, the size of the contact surface and the magnitude of the contact pressure. Finally, as regards to provision of intermediate layer 2 by applying a liquid metal, it is necessary for the core and the mantle to have the same or substantially the same temperature. Inter alia, the different coefficients of expansion of the core and the mantle, especially if the fusing point of the metal or metal compound is comparatively high, will present problems which interfere with the ability of the fuel element to function efficiently. In addition, a disadvantageous oxidation of core 3 and mantle 1 may occur. Consequently, it appears most suitable from practical considerations to apply a solid intermediate layer 2 notwithstanding certain theoretical beneficial results obtainable with use of a gaseous or liquid intermediate layer.

To produce a fuel element which from a manufacturing and metallurgical point of view is considerably simpler than the above-named element comprising prepressed and presintered slugs of a suitable fissible material, it is conceivable in principle to fill the mantle with, for instance, uranium dioxide powder which then is allowed to self-sinter when the fuel elements begins to operate, that is to say when its temperature reaches the operating temperature. The manner of applying the above-named intermediate layer 3 of some suitable metal or metal compound is decisive, in this case, for the ability of function of the element. Another important factor in this regard is the density of the uranium dioxide used as core 2, which means that it is desirable to apply a certain pressure for inserting the uranium dioxide powder into mantle 1. Such pressure is necessary not only to insert an amount of uranium dioxide as great as possible, but also to obtain a degree of porosity as low as possible of the subsequently sintered core. It is obviously difficult, or indeed impossible, to force a uranium dioxide powder core 2 into a mantle 1 of uranium if it is required at the same time not only to apply an intermediate layer 3 of a suitable metal or metal alloy, but also to prevent mantle 1 from being subjected to a detrimental pressure.

According to another feature of the invention, the problem of applying an intermediate layer 3 of a solid material between the core and the mantle is solved in a practical and economical manner irrespective of whether or not presintered slugs of, for instance, uranium dioxide are used or the core is applied in the form of a forced-in non-sintered powder.

Referring now to FIGURES 7 and 8, a cast or mechanically produced tube 13 of the metal or metal alloy in consideration is externally ground so as to fit reasonably snugly inside of the mantle 1. Suitable metals or metal alloys for this purpose include magnesium, aluminium, zirconium, beryllium or stainless steel. If pressed or sintered slugs are used it is suitable to provide for an accurate tolerance even on the inside of the tube with respect to the diameters of the slugs. If uranium dioxide powder is to be forced in to constitute the core it is necessary to apply a pressure on the powder such as to obtain a density as high as possible. In this case the procedure is preferably such that a tube consisting of the metal compound and having an outer diameter which as accurately as possible is adapted to the diameter of the mantle is placed into a matrix or a tool 14 made for a press 15 adapted to exert the necessary compression pressure. Such an apparatus is very simple to produce in practice and is consequently inexpensive. Then tube 13 together with its uranium dioxide powder is inserted into the mantle which thereafter is closed by a suitable end plug 16 consisting of a material which is advantageous from the point of view of neutron economy. End plug 16 may be inserted during the pressing operation. As a result thereof, it is possible to apply any desired pressure as the powder is forced in to obtain thereby the highest possible density of the uranium dioxide powder which is advantageous as regards reactor physical, metallurgical as well as mechanical stability considerations. In addition, the generation of fission gases are thereby reduced as a result of the increased density of the uranium dioxide powder. Finally, the thickness of intermediate layer 13 is determined substantially by the degrees of contraction of the material upon rise of temperature of the fuel element to the operating temperature, and may during or after operation of the reactor thus be less than the initial wall thickness.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a multiregion fuel element for a nuclear reactor, said fuel element consisting in large part of a fissile material present within an inner core region and an outer mantle region, the fissile material in said core region being capable of withstanding comparatively high temperatures prevailing in the central part of the fuel element and the fissile material in the mantle region having physical properties different from the physical properties of the core material and having a comparatively high heat transfer capability and comparatively superior nuclear properties at a temperature determined substantially by the thermal stability of the material which is lower than the temperature of the core during operation, the improvement wherein the inner core region is separated from the outer mantle region by a distance sufficient to provide a space that is filled with a non-fissile substance that has low neutron absorption cross-section, is substantially chemically inert to the material of the core and the mantle and facilitates removal and distribution of heat.

2. The fuel element as defined in claim 1, wherein said non-fissile material is a gas and the core material is composed primarily of pre-solidified members.

3. The fuel element as defined in claim 1, wherein said non-fissile material is a liquid at operating temperatures of the fuel element.

4. The fuel element as defined in claim 1, wherein said non-fissile material is a solid at operating temperatures of the fuel element.

5. The fuel element as defined in claim 1, wherein the core region material is composed of an inner central portion enriched to contain a higher concentration of fissionable nuclei as compared with the enrichment of the remaining material in the core region and in the mantle region.

6. In a multiregion fuel element for a nuclear reactor, said fuel element having a central core containing fissile material in a form capable of withstanding comparatively high temperatures prevailing in the central part of the fuel element; and an outer mantle of fissile material having physical properties different from physical properties of the core material and a comparatively higher heat transfer capability and comparatively superior nuclear properties at a temperature determined substantially by the thermal stability of the material which is lower than the temperature of the core during operation, said mantle being spaced from outer walls of said core by an intermediate layer of non-fissile substance that has a low neutron absorption cross-section, is substantially chemically inert to the materials of the core and of the mantle and facilitates removal and distribution of heat.

7. The fuel element as defined in claim 6, wherein the core region is composed of uranium oxide and has an inner central portion enriched to contain a higher concentration of fissionable nuclei as compared with the enrichment of the remaining materials in the core region and in the mantle region, and wherein the outer mantle of fissionable material is composed of a substance selected from the group consisting of metals and metal alloys.

References Cited by the Examiner

UNITED STATES PATENTS

| | | | |
|---|---|---|---|
| 2,777,812 | 1/1957 | Powell et al. | |
| 2,852,460 | 9/1958 | Abbott et al. | |
| 2,872,402 | 2/1959 | Ura et al. | 29—420 |
| 2,885,287 | 5/1959 | Larson. | |
| 2,915,815 | 12/1959 | Bean et al. | |
| 2,975,113 | 3/1961 | Gordon. | |
| 2,990,351 | 6/1961 | Sanz et al. | |
| 2,991,601 | 7/1961 | Glatter et al. | |
| 2,993,786 | 7/1961 | Roboff et al. | |
| 3,028,329 | 4/1962 | Mahlmeister | 176—72 |
| 3,041,262 | 6/1962 | Jens | 176—72 |
| 3,042,598 | 7/1962 | Growther. | |
| 3,067,117 | 12/1962 | Hauth et al. | 29—420 |

FOREIGN PATENTS

| | | |
|---|---|---|
| 835,132 | 5/1960 | Great Britain. |
| 841,608 | 7/1960 | Great Britain. |
| 878,911 | 10/1961 | Great Britain. |

LEON D. ROSDOL, *Primary Examiner.*

OSCAR R. VERTIZ, CARL D. QUARFORTH,
*Examiners.*

R. W. MACDONALD, J. V. MAY, M. J. SCOLNICK,
*Assistant Examiners.*